(12) United States Patent
Joshi et al.

(10) Patent No.: US 12,235,167 B2
(45) Date of Patent: Feb. 25, 2025

(54) TEMPERATURE SENSOR

(71) Applicant: Valeo Siemens eAutomotive Germany GmbH, Erlangen (DE)

(72) Inventors: Hrishikesh Joshi, Erlangen (DE); Andreas Held, Erlangen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 367 days.

(21) Appl. No.: 17/661,976

(22) Filed: May 4, 2022

(65) Prior Publication Data

US 2022/0364935 A1  Nov. 17, 2022

(30) Foreign Application Priority Data

May 5, 2021 (DE) ..................... 10 2021 204 505.7

(51) Int. Cl.
*G01K 1/20* (2006.01)
*G01K 7/22* (2006.01)
*G01K 13/08* (2006.01)

(52) U.S. Cl.
CPC ................. *G01K 1/20* (2013.01); *G01K 7/22* (2013.01); *G01K 13/08* (2013.01)

(58) Field of Classification Search
CPC .......... G01K 1/00; G01K 1/20; G01K 15/005; G01K 7/16; G01K 7/22; G01K 7/24;
(Continued)

(56) References Cited

U.S. PATENT DOCUMENTS

2009/0232185 A1   9/2009 Sasaki et al.
2011/0106476 A1   5/2011 Son et al.
(Continued)

FOREIGN PATENT DOCUMENTS

CN   204241124 U   4/2015
DE   102011112675 A1   7/2012

OTHER PUBLICATIONS

German Search Report in corresponding German Application No. 10 2021 204 505.7, dated Dec. 14, 2021 (8 pages).
(Continued)

*Primary Examiner* — Son T Le
*Assistant Examiner* — Matthew W. Baca
(74) *Attorney, Agent, or Firm* — Osha Bergman Watanabe & Burton LLP (57) ABSTRACT

A temperature sensor (116) comprises an electrical circuit (204) including a thermistor (206) intended to be placed next to an object (112); a temperature measurement module (222) configured for determining a measured temperature (T_M) of the thermistor (206) from a resistance of the thermistor (206); and a command module (224) configured for providing a command (C) to the electrical circuit (204) for modifying the electrical circuit (204) in a way that changes a current (IT) flowing in the thermistor (206). The temperature sensor (116) further comprises a thermal loss determination module (226) configured for determining a thermal loss (L) of the thermistor (206) from the thermistor measured temperature (T_M) and the command (C); and a temperature estimation module (228) configured for estimating a temperature (T0_E) of the object (112) from the thermistor measured temperature (T_M) and from the thermal loss (L) of the thermistor (TH).

12 Claims, 5 Drawing Sheets

(58) Field of Classification Search
CPC ............ G01K 7/021; G01K 7/14; G01K 7/21;
G01K 13/04; G01K 13/08; H01C 7/008;
H01C 7/04
See application file for complete search history.

(56) References Cited

U.S. PATENT DOCUMENTS

| | | | |
|---|---|---|---|
| 2012/0062041 A1* | 3/2012 | Nelson | G01K 7/24 |
| | | | 307/116 |
| 2015/0219503 A1 | 8/2015 | Yoshida | |
| 2020/0395641 A1* | 12/2020 | Suzuki | H01M 10/615 |
| 2023/0238911 A1* | 7/2023 | Kobayashi | H02P 29/68 |
| | | | 318/471 |
| 2024/0014765 A1* | 1/2024 | Kamiya | H02P 29/662 |

OTHER PUBLICATIONS

Extended European Search Report issued in European Application No. 22169264.3, dated Oct. 7, 2022 (9 pages).

* cited by examiner

TEMPERATURE SENSOR

The present invention relates to a temperature sensor, an electric machine comprising such a sensor, an electric drive comprising such an electric machine, and a vehicle comprising such an electric drive. It is especially intended be used in an automotive vehicle.

The utility model with publication number CN 204 241 124 U describes a temperature sensor comprising a thermistor and a three resistors in parallel connected to the thermistor. Three operable switches are respectively associated with the three resistors to select one of the resistors at a time, to be connected to the thermistor. The temperature sensor further comprises a device for measuring a voltage of the thermistor and estimating a temperature of the thermistor from the measured voltage.

By changing the resistor connected to the thermistor, the temperature changes the measurement range.

An object of the invention is to allow to improve the temperature sensor measurement.

The object of the invention may be solved by a temperature sensor comprising:
- an electrical circuit including a thermistor intended to be placed next to an object;
- a temperature measurement module configured for determining a measured temperature of the thermistor from an electrical quantity of the electrical circuit that depends on a resistance of the thermistor; and
- a command module configured for providing a command to the electrical circuit for modifying the electrical circuit behavior in a way that changes a current flowing in the thermistor;
- a thermal loss determination module configured for determining a thermal loss of the thermistor from the thermistor measured temperature and the command; and
- a temperature estimation module configured for estimating a temperature of the object from the thermistor measured temperature and from the thermal loss of the thermistor.

Thanks to the invention, the thermal loss of the thermistor is taken into account in the temperature estimation so that the measurement inaccuracy due to this thermal loss may be at least partially avoided. As the thermal loss changes with the thermistor current, the change of current is also taken into account. This leads to a better estimation of the temperature of the object by the temperature estimation module.

Some further optional features of the invention which can be used together or separately are developed below.

The thermal loss determination module may comprise first data and second data each associating the thermal loss of the thermistor to the measured temperature of the thermistor and the thermal loss determination module may be configured for providing the thermal loss associated to the measured temperature according to the first data when the command takes a first command value, and according to the second data when the command takes a second command value, different from the first command value. In this manner, the invention is adapted to the case where the command is to be applied to a switch for modifying the electric circuit.

The command module may be configured for providing the command selectively at the first and second command values according to a comparison of an estimated temperature of the object with a hysteresis threshold. With a fixed threshold, constant switching (on/off) of the switch could occur when the temperature is at the threshold. This may be avoided with a hysteresis threshold.

The temperature estimation module may comprise:
- a global dynamic thermal model configured for providing the object estimated temperature, including, coupled together:
  - a dynamic thermal model of the thermistor having a thermistor thermal loss parameter, and
  - a dynamic thermal model of the object;
- a state observer configured to estimate a thermal loss correction by means of the thermistor measured temperature and the object estimated temperature; and
- a correction module configured for correcting the thermal loss of the thermistor according to the thermal loss correction in order to provide the thermistor thermal loss parameter.

Using dynamic models allows a fine estimation of the object temperature from the measured temperature of the thermistor.

The correction module may be configured for adding the thermal loss correction to the thermal loss of the thermistor.

The temperature sensor may further comprise a housing, for example a glass housing, inside of which the thermistor extends, while the object is intended to extend outside. The thermistor may be thin and delicate. The housing may therefore protect the thermistor, in particular during insertion of the temperature sensor in the stator windings.

The global dynamic thermal model may comprise a dynamic thermal model of the housing, coupled to the thermistor dynamic thermal model and to the object dynamic thermal model.

The electrical circuit may comprise a resistance stage connected to the thermistor so as to form a voltage divider, and the temperature measurement module may be configured to measure a voltage at a middle point of the voltage divider. This is a simple way to get the thermistor resistance, and then the thermistor temperature.

The resistance stage may have a resistance changing with the command.

The resistance stage may comprise two resistors in parallel and a switch operated by the command for selectively connect and disconnect one of the two resistors. This offers a simple solution to change the resistance stage resistance, and therefore the measurement range.

The invention also relates to an electric machine comprising a stator and a temperature sensor according to the invention, for estimating a temperature of the stator.

The invention also relates to an electric drive comprising an inverter and an electric motor according to the invention, driven by the inverter.

The invention also relates to a vehicle comprising drive wheels and an electric drive according to the invention for driving, at least indirectly, at least one of the wheels.

The present invention will be described more specifically with reference to the following drawings, in which.

Figure 1:
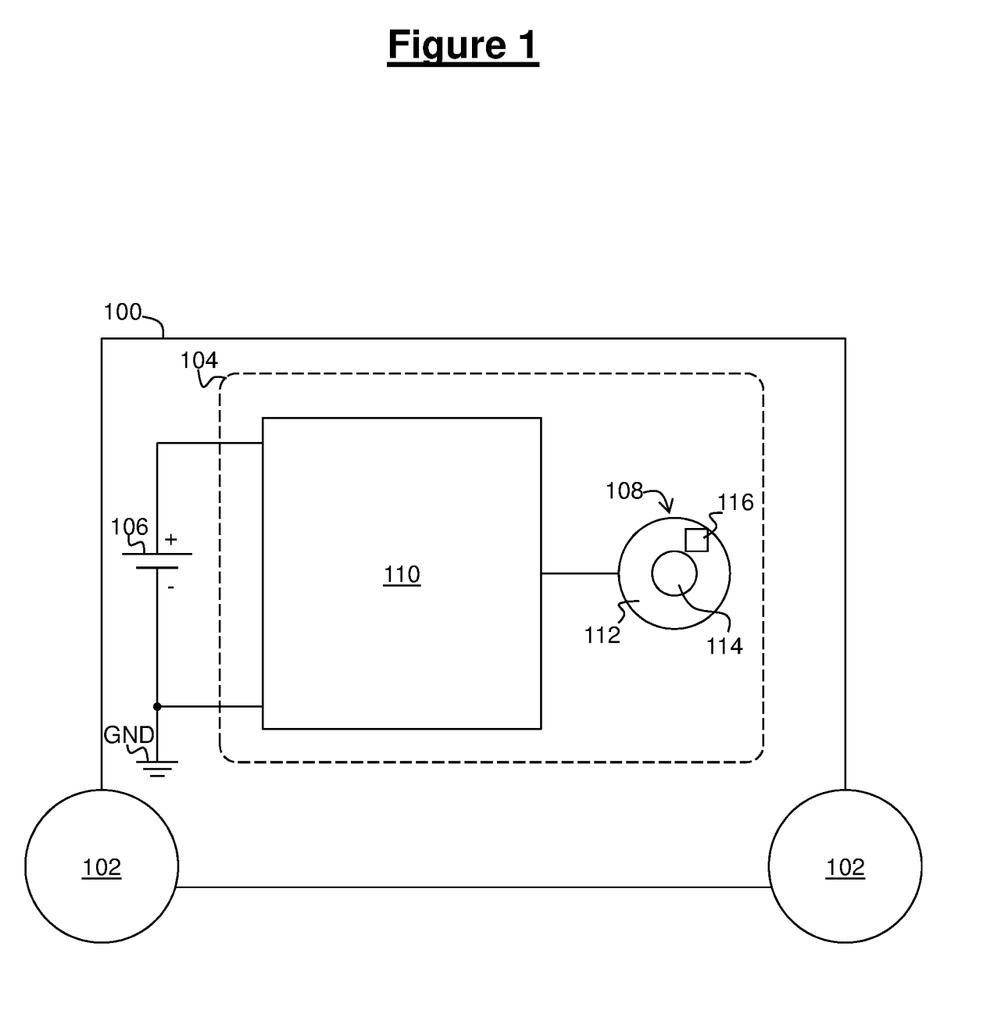
FIG. 1 is a schematic view showing an embodiment of a vehicle comprising an electric motor according to the invention.

Referring to FIG. 1, a vehicle 100 according to the invention will now be described. In the described example, the vehicle 100 is an automotive vehicle.

The vehicle 100 comprises drive wheels 102 for causing the vehicle to move, and an electric drive 104 configured to drive at least one of the drive wheels 102 at least indirectly. The vehicle 100 further comprises a DC voltage source 106, such as a battery, for electrically powering the electric drive 104.

The electric drive 104 comprises an electric motor 108 and an inverter 110 configured to drive the motor 108, for instance by supplying electric power from the DC voltage source 106. The motor 108 is a rotary electric motor comprising a stator 112 and a rotor 114 configured to rotate around a rotation axis with respect to the stator 112.

The motor 108 further comprises a temperature sensor 116 for estimating a temperature T0 of the stator 112.

Figure 2:
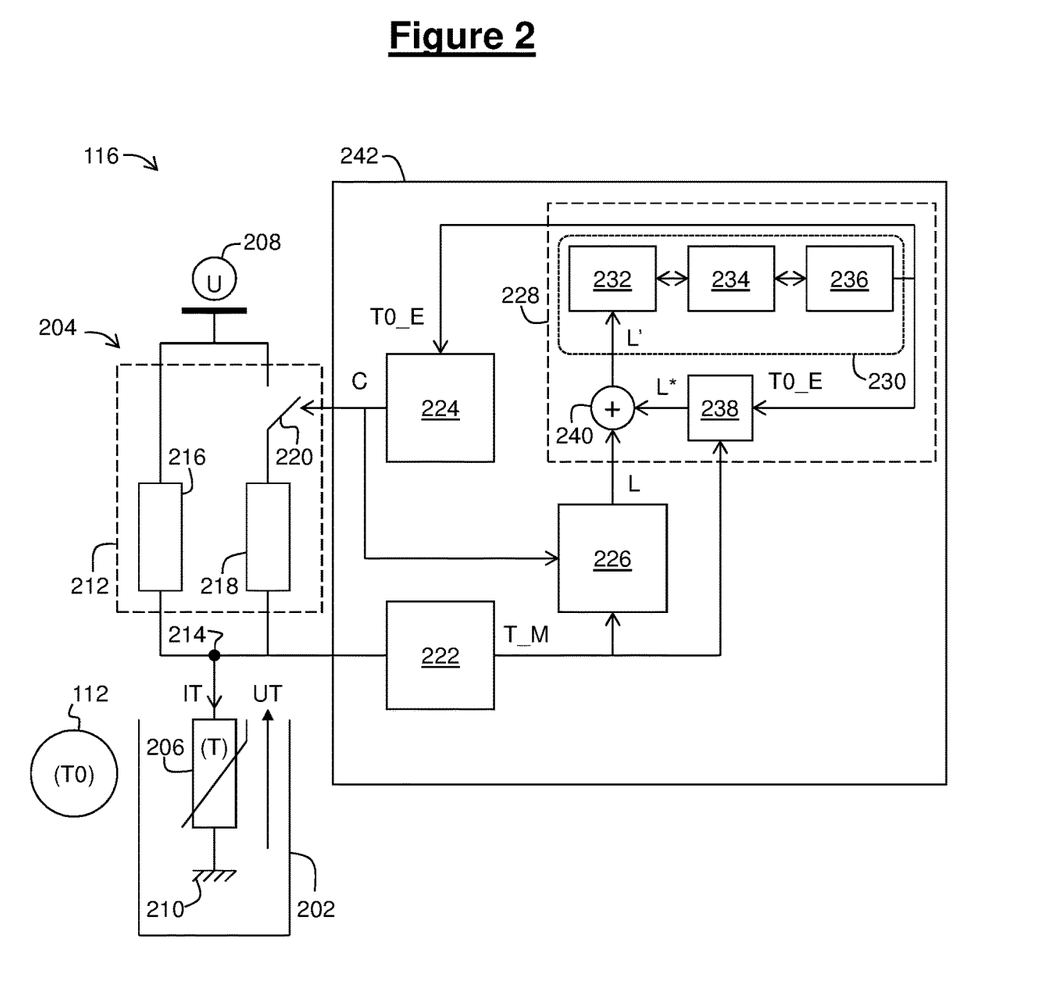
FIG. 2 is a functional view of a temperature sensor of the electric motor of FIG. 1.
Figure 3:
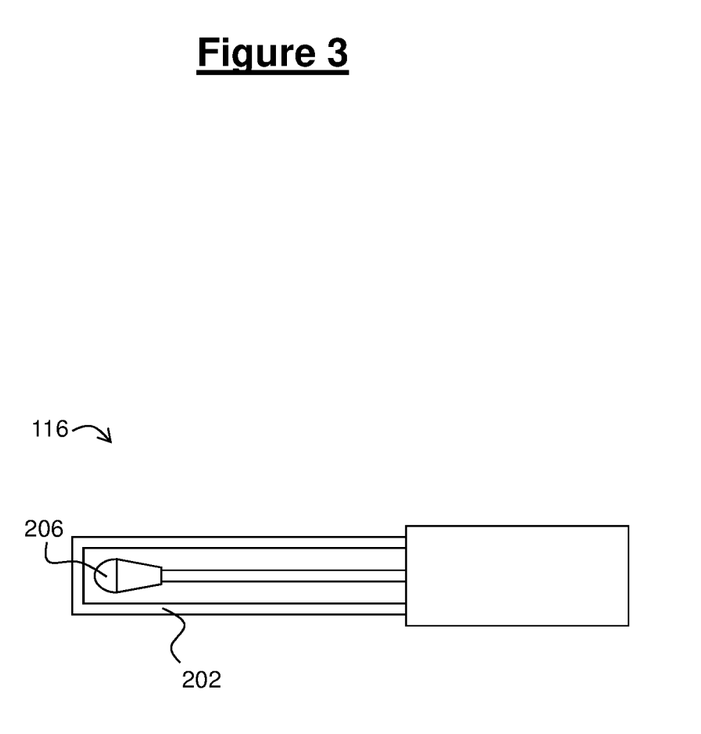
FIG. 3 is a three dimensional view of the temperature sensor of FIG. 2.

Referring to FIGS. 2 and 3, an example of temperature sensor 116 will now be described.

The temperature sensor 116 comprises a housing 202, for example a glass housing.

The temperature sensor 116 further comprises an electrical circuit 204 including a thermistor 206 extending inside the housing 202, while the stator 112 extends outside, preferably in contact with the housing 202. With this arrangement, the heat goes from the stator 112 to the thermistor 206 through the housing 202.

The thermistor 206 has, for example, a negative temperature coefficient (NTC). With respect to a positive temperature coefficient (PTC) thermistor, the NTC thermistor 206 has a greater temperature operating range, in particular in high temperature possibly up until 600° C., and is robust.

In the described example, the electrical circuit 204 comprises a constant voltage source 208 configured to provide a constant voltage U with respect to an electric ground 210 of the electrical circuit 204. The electrical circuit 204 further comprises a resistance stage 212 connected to the thermistor 206 at a middle point 214 so as to form a voltage divider. The resistance stage 212 is configured to receive a command C for modifying a resistance R of the resistance stage 212.

In the described example, the resistance stage 212 comprises two resistors 216, 218 in parallel and a switch 220 operated by the command C for selectively connecting and disconnecting one of the two resistances (the resistor 218 in the described example).

In this manner, the resistance R of the resistance stage 212 is equal to a resistance value R1 when the switch 220 is opened by the command C having a command value C1, while the resistance R is equal to a resistance value R2, lower than the resistance value R1, when the switch 220 is closed by the command C having a command value C2.

More precisely, the resistance value R1 is equal to a resistance R216 of the resistor 216, while the resistance value R2 is equal to an equivalent resistance RE of the resistors 216, 218 in parallel, given by:

$$R2 = RE = \frac{R216 \cdot R218}{R216 + R218} = \frac{1}{1 + R216/R218} \cdot R216 < R216 = R1$$

In the described example, the resistance stage 212 is connected between the voltage source 208 and the middle point 214, while the thermistor 206 is connected between the middle point 214 and the electric ground 210.

The temperature sensor 116 further comprises a temperature measurement module 222 configured for measuring an electrical quantity of the electrical circuit 204 that depends on a resistance RT of the thermistor 206, and for determining a measured temperature T_M of the thermistor 206 from the measured electrical quantity.

In the described example, the electrical quantity is a voltage UT across the thermistor 206. To measure the thermistor voltage UT, the temperature measurement module 222 is for example connected to the middle point 214 of the voltage divider, so that the thermistor voltage UT is equal to a potential of the middle point 214 with respect to the electric ground 210.

With this arrangement, the thermistor voltage UT is given by:

$$UT = \frac{RT}{RT + R} U$$

Since the thermistor resistance RT is dependent on the thermistor temperature T, the thermistor voltage UT is also dependent on the temperature T so that measuring the thermistor voltage UT allows the temperature measurement module 222 to determine the measured temperature T_M.

Furthermore, by changing the value of the resistance R of the resistance stage 212, a temperature range where the temperature sensor 116 is most sensitive (i.e. where the thermistor voltage UT varies greatly as a function of the temperature T of the thermistor 206) is selected. More precisely, when the resistance R is equal to the resistance value R1, then the temperature sensor 116 is sensitive in a first temperature range, while when the resistance R is equal to the resistance value R2, then the temperature sensor 116 is sensitive in a second temperature range, higher than the first temperature range.

Besides, with the described arrangement, a current IT flowing in the thermistor 206 is given by:

$$IT = \frac{U}{RT + R}$$

Changing the value of the resistance R also changes the thermistor current IT:

$$IT(R1) = \frac{U}{RT + R1} < \frac{U}{RT + R2} = IT(R2)$$

Therefore, switching the resistance R from the resistance value R1 to the resistance value R2 increases the thermistor current IT, which increases a self-heating of the thermistor 206.

The temperature sensor 116 further comprises a command module 224 configured for providing the command C to the electrical circuit 204, and more precisely to the switch 220 in the described example.

For example, the command module 224 is configured for determining the command C from an estimation of the temperature T0 of the stator 112. For example, the command module 224 is configured for providing the command C selectively at the first and second command values C1, C2 according to a comparison of the stator estimated temperature with a hysteresis threshold. In this manner, the command C passes from the command value C2 to the command value C1 when the stator estimated temperature passes below a threshold value T1, while the command C passes from the command value C1 to the command value C2 when the stator estimated temperature passes above a threshold value T2, higher than the threshold value T1.

In some embodiments, the stator estimated temperature used by the command module 224 can be the thermistor measured temperature T_M. However, preferably, the stator estimated temperature used by the command module 224 is a temperature taking into account the self-heating of the thermistor 206 resulting from the thermistor current IT.

The temperature sensor 116 further comprises a thermal loss determination module 226 configured for determining a thermal loss L of the thermistor 206 from the thermistor measured temperature T_M and the command C. For example, the thermal loss determination module 226 comprises first data D1 and second data D2 each associating the thermal loss L of the thermistor 206 to the measured temperature T_M of the thermistor 206.

The thermal loss determination module 226 is then configured for providing the thermal loss L associated to the measured temperature T_M according to the first data D1 when the command C takes the command value C1, and according to the second data when the command C takes the command value C2. Each of the first and second data D1, D2 comprises either a function or a table.

The first and second data D1, D2 will be described in greater detail below, with reference to FIG. 5.

The temperature sensor 116 further comprises a temperature estimation module 228 configured for determining an estimated temperature T0_E of the object 112 from the thermistor measured temperature T_M and from the thermistor thermal loss L.

The temperature estimation module 228 first comprises a global dynamic thermal model 230 configured to provide the stator estimated temperature T0_E.

The global dynamic thermal model 230 includes a dynamic thermal model 232 of the thermistor 206, a dynamic thermal model 234 of the housing 202 and a dynamic thermal model 236 of the motor 108 (which includes the stator 112).

The dynamic thermal model 234 of the housing 202 is coupled to both the dynamic thermal model 232 of the thermistor 206 and the dynamic thermal model 236 of the stator. In this manner, in the described example, the dynamic thermal model 232 of the thermistor 206 and the dynamic thermal model 236 of the stator are coupled together through the dynamic thermal model 234 of the housing 202.

The dynamic thermal model 232 of the thermistor 206 has a thermistor thermal loss parameter L'.

The temperature estimation module 228 further comprises, in the described example, a state observer 238 configured to estimate a thermal loss correction L* for correcting the thermistor thermal loss L. The estimation is, for example, made from the thermistor measured temperature T_M and the stator estimated temperature T0_E.

The temperature estimation module 228 further comprises a correction module 240 configured for correcting the thermistor thermal loss L according to the thermal loss correction L* in order to provide the thermistor thermal loss parameter L'. For example, the combination module 240 is configured for adding the thermal loss correction L* to the thermistor thermal loss L. In some embodiments, there could be no thermal loss correction L*, so that the thermistor thermal loss parameter L' would simply be equal to the thermistor thermal loss L.

In the described example, the stator estimated temperature T0_E is the temperature used by the command module 224.

In some embodiments, the temperature sensor 116 may comprise a computer device 242 including a processing unit (not shown) and a memory (not shown) coupled to the processing unit. A computer program may be loaded into the memory so that computer instructions of the computer program may be executed by the processing unit. The modules 222, 224, 226, 228 may therefore be software implemented in the computer program. Alternatively, parts or all of the modules 222, 224, 226, 228 may be hardware implement in electrical circuits not using computer program.

Figure 4:
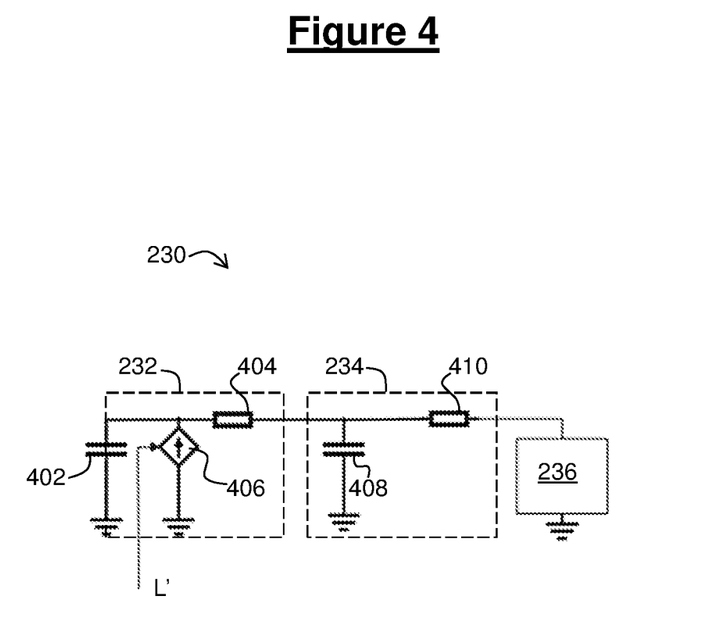
FIG. 4 is a functional view of a dynamic thermal model used in the temperature sensor of FIGS. 2 and 3.

Referring to FIG. 4, the global dynamic thermal model 230 is an electrical circuit model using electrical components to model a thermal behavior of the system (stator 112, housing 202 and thermistor 206).

In particular, the thermistor dynamic thermal model 232 comprises for example a capacitance 402 and a resistance 404 connected one to another. The thermistor dynamic thermal model 232 further comprises a current source 406 configured to inject a current equal to the thermal loss parameter L' at a middle point between the capacitance 402 and the resistance 404.

In particular, the housing dynamic thermal model 234 comprises for example a capacitance 408 and a resistance 410 connected one to another.

The resistance 404 of the thermistor dynamic thermal model 232 is for example connected to the middle point between the capacitance 408 and the resistance 410, to couple the two models 232, 234.

The motor dynamic thermal model 236 is then for example connected to the resistance 410, to couple the two models 234, 236.

Figure 5:
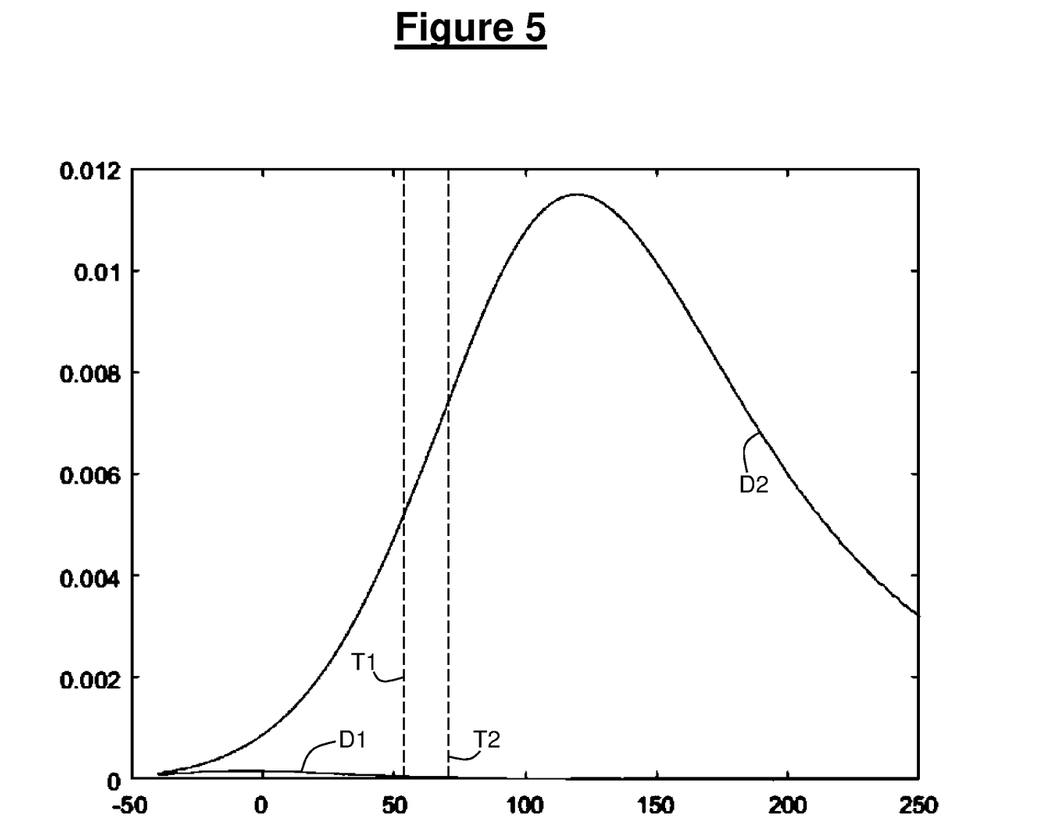
FIG. 5 is a graph showing two curves giving a thermal loss of a thermistor of the temperature sensor as a function of the thermistor temperature.

Referring to FIG. 5, an example of first and second data D1, D2 is illustrated. The abscissa indicates the thermistor measured temperature T_M in ° C. and the ordinate indicates the thermal loss L in W.

As illustrated, the thermal loss L is largely higher in the second data D2 (corresponding to the high temperature range) than in the first data D1 (corresponding to the low temperature range). In other word, the thermal loss in the first data D1 could be considered negligible. For this reason, in some embodiments, the first data D1 could associate the same thermal loss L, for example zero thermal loss, to all thermistor measured temperatures T_M (the curve on FIG. 5 would be an horizontal line). In this manner, no table or function needs to be stored. In this case, only the second data D2 would actually associate different thermal loss L to different thermistor measured temperature T_M.

In the described example, the first data D1 covers temperatures above the threshold value T2 and the second data D2 covers temperatures below the threshold value T1, although these covered temperatures are not used. This may however be advantageous if the thresholds T1, T2 needs to be changed/updated, for example if the thermistor 206 is changed.

It will be noted that the invention is not limited to the embodiments described above. It will indeed appear to those skilled in the art that various modifications can be made to the embodiments described above, in the light of the teaching which has just been disclosed.

In the previous detailed description of the invention, the terms used should not be interpreted as limiting the invention to the embodiments presented in the present description, but should be interpreted to include all the equivalents within the reach of those skilled in the art by applying their general knowledge to the implementation of the teaching which has just been disclosed.

The invention claimed is:

1. A temperature sensor comprising:
an electrical circuit including a thermistor configured to be placed next to an object;
a temperature measurement module configured for determining a measured temperature of the thermistor from an electrical quantity of the electrical circuit that depends on a resistance of the thermistor; and
a command module configured for providing a command to the electrical circuit for modifying the electrical circuit behavior in a way that changes a current flowing in the thermistor;
a thermal loss determination module configured for determining a thermal loss of the thermistor from the thermistor measured temperature and the command; and
a temperature estimation module configured for estimating a temperature of the object from the thermistor measured temperature and from the thermal loss of the thermistor;
wherein the temperature estimation module comprises:
a global dynamic thermal model configured for providing the object estimated temperature, including, coupled together:
a dynamic thermal model of the thermistor having a thermistor thermal loss parameter, and
a dynamic thermal model of the object;
a state observer configured to estimate a thermal loss correction from the thermistor measured temperature and the object estimated temperature; and
a correction module configured for correcting the thermal loss of the thermistor according to the thermal loss correction to provide the thermistor thermal loss parameter.

2. The temperature sensor according to claim 1, wherein the thermal loss determination module comprises first data and second data each associating the thermal loss of the thermistor to the measured temperature of the thermistor and wherein the thermal loss determination module is configured for providing the thermal loss associated to the measured temperature according to the first data when the command takes a first command value, and according to the second data when the command takes a second command value, different from the first command value.

3. The temperature sensor according to claim 2, wherein the command module is configured for providing the command selectively at the first and second command values according to a comparison of an estimated temperature of the object with a hysteresis threshold.

4. The temperature sensor according to claim 1, wherein the correction module is configured for adding the thermal loss correction to the thermal loss of the thermistor.

5. The temperature sensor according to claim 1, further comprising a glass housing, inside of which the thermistor extends, while the object is configured to extend outside.

6. The temperature sensor according to claim 5, wherein the global dynamic thermal model comprises a dynamic thermal model of the housing, coupled to the thermistor dynamic thermal model and to the object dynamic thermal model.

7. The temperature sensor according to claim 1, wherein the electrical circuit comprises a resistance stage connected to the thermistor so as to form a voltage divider, and wherein the temperature measurement module is configured to measure a voltage at a middle point of the voltage divider.

8. The temperature sensor according to claim 7, wherein the resistance stage has a resistance changing with the command.

9. The temperature sensor according to claim 8, wherein the resistance stage comprises two resistors in parallel and a switch operated by the command for selectively connecting and disconnecting one of the two resistors.

10. An electric machine comprising a stator and a temperature sensor according to claim 1, for estimating a temperature of the stator.

11. An electric drive comprising: an inverter; and the electric machine according to claim 10, driven by the inverter.

12. A vehicle comprising: drive wheels and an electric drive according to claim 11 for driving, at least indirectly, at least one of the wheels.

* * * * *